June 12, 1956     B. J. MITCHELL     2,749,901
COMBUSTION CHAMBER

Filed April 16, 1952     3 Sheets-Sheet 1

Inventor
Boris John Mitchell
By Willits, Helwig & Baillio
Attorneys

June 12, 1956  B. J. MITCHELL  2,749,901
COMBUSTION CHAMBER
Filed April 16, 1952  3 Sheets-Sheet 2

Inventor
Boris John Mitchell
By
Willits, Helmig & Caillio
Attorneys

Inventor
Boris John Mitchell
By
Willits Helwig & Cailles
Attorneys

United States Patent Office 2,749,901
Patented June 12, 1956

2,749,901

COMBUSTION CHAMBER

Boris John Mitchell, Birmingham, Mich., assignor to General Motors Corporation, Detroit, Mich., a corporation of Delaware Application April 16, 1952, Serial No. 282,510

10 Claims. (Cl. 123—191)

This invention relates to combustion chambers for engines and has particular relation to combustion chambers for spark ignited, four stroke cycle, valve in head internal combustion engines for automotive and other uses.

It is proposed to provide a combustion chamber for engines that is formed largely in the piston of an engine, that can be formed by tools capable of forming surfaces of revolution, that will be as compact as possible, and that may be formed to a large extent on a side of the cylinder remote from the inlet and exhaust valves thereof and will have a minimum length flame travel in all directions from the spark gap of a spark plug in the head of the engine.

Figure 1:
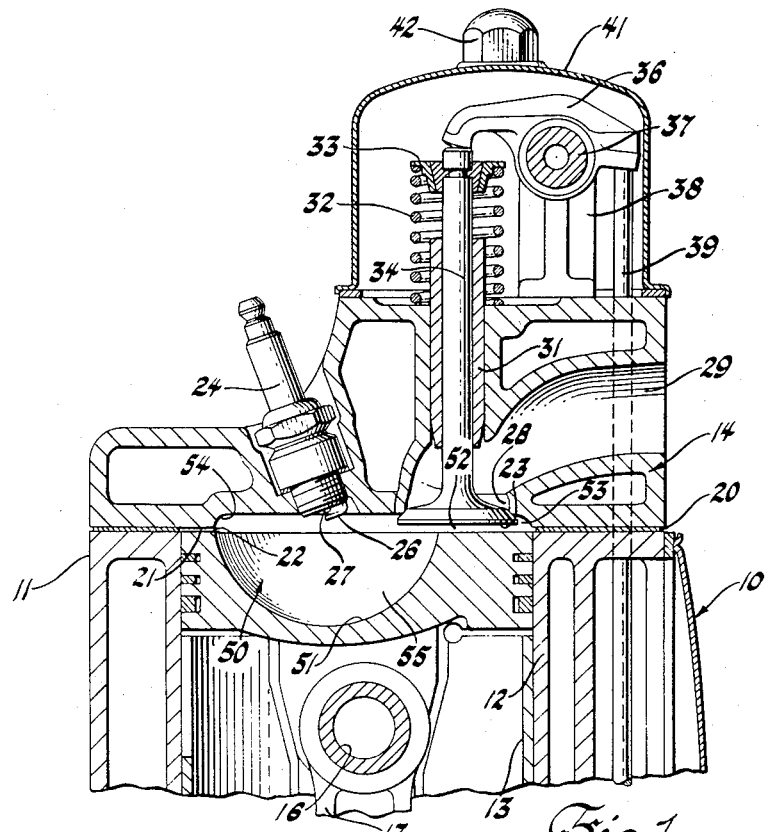
Figure 1 is a transverse sectional view through an engine having a combustion chamber embracing the principles of the invention.

In the engines 10 disclosed by all of the figures of the drawing, there is provided engine blocks 11 formed to provide cylinders 12 containing pistons 13 and having heads 14. The pistons 13 have wrist pins 16 by which the pistons are operated by connecting rods 17 from the crankshafts for the engines 10. The engine heads 14 have inlet and exhaust valves 18 and 19 mounted therein in opposed relation to the pistons 13, substantially within the peripheral limits of the inside surfaces of the cylinders 12, with the axes thereof in parallel relation to the axes of the cylinders 12 and on one side of the axes of the cylinders 12. The cylinder heads 14 have plane surfaces 21 disposed normally with respect to the axes of the cylinders 12 and in opposed relation to parallel plane surfaces 22 formed on the adjacent ends of the pistons 13. A slight clearance may be provided between the surfaces 21 and 22 by gaskets 20 which may be secured between the heads 14 and the blocks 11. This may provide a minimum mechanical clearance to facilitate the operation of the pistons 13 and the valves 18 and 19. The valves 18 and 19 have end surfaces 23 which lie substantially in the planes of the plane surfaces 21 of the heads 14. The heads 14 also have spark plugs 24 secured therein. The spark plugs 24 have terminals 26 at the inner ends thereof between which spark gaps 27 are formed within the cylinders 12.

The valves 18 and 19 are adapted to close ports 28 at the inner ends of inlet and exhaust passages 29 which are formed in the heads 14 and which respectively communicate with any suitable inlet and exhaust manifolds with which the engines 10 may be provided. The valves 18 and 19 are mounted in the heads in bearing sleeves 31 and are adapted to be resiliently closed by springs 32 which are confined between the heads 14 and spring retainer washers 33 secured to the valve stems 34 in spaced relation to the adjacent surfaces of the heads 14. The valves are adapted to be opened by rocker arms 36 mounted on rocker shafts 37 which are secured to the heads 14 by supports 38. The rocker arms 36 are operated by camshafts for the engines 10 through push rods indicated at 39. The valve actuating mechanisms for the engines 10 may be closed by covers 41 secured to the heads 14 by bolts indicated at 42.

Figure 2:
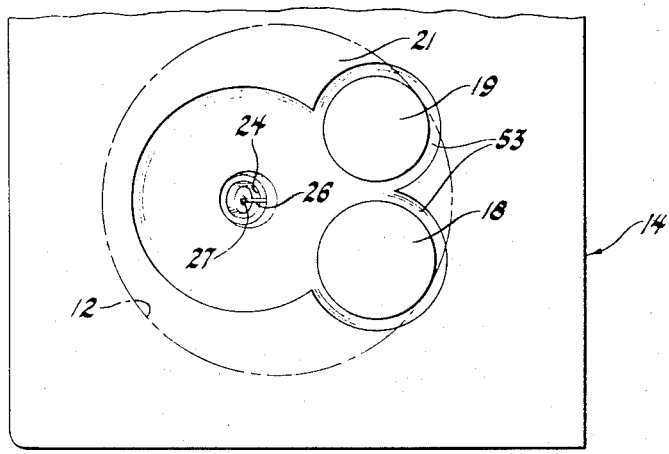
Figure 2 is a bottom plan view of the head of the engine disclosed by Figure 1.

The combustion chamber 50 in the structure disclosed by Figures 1 and 2 is partly formed by a concave wall 51 forming a firing chamber 55 which extends within the head end of the piston 13. Another part of the combustion chamber 50 is formed by the clearance space 52 which is approximately the thickness of the gasket 20 and which is located beyond the chamber 55 but within the periphery of the cylinder 12 and between the planar walls 21 and 22 of the head 14 and the piston 13. Another part of the combustion chamber 50 is the annular clearance spaces 53 which surround the valves 18 and 19 and which projects within the plane surface 21 of the head 14 to the lower edges of the annular surfaces on which the valves 18 and 19 seat. The annular clearance spaces 53 merge with another chamber in the head 14. which continues across and at the same depth as the clearance spaces 53, to provide an extension of the combustion chamber indicated at 54. The extension 54 also provides a continuation of the chamber 55 formed within the wall 51 of the piston 13. The spark gap 27 is approximately within the upper plane surface of the head forming the extension 54. The annular clearance spaces 53 are symmetrical with respect to the axes of the valves 18 and 19, the clearance space 52 is symmetrical with respect to the axis of the cylinder 12 and the surfaces of the extension 54 and the chamber 55 are symmetrical with respect to a line through the spark gap terminal 27 and parallel with the axis of the cylinder 12.

Figure 3:
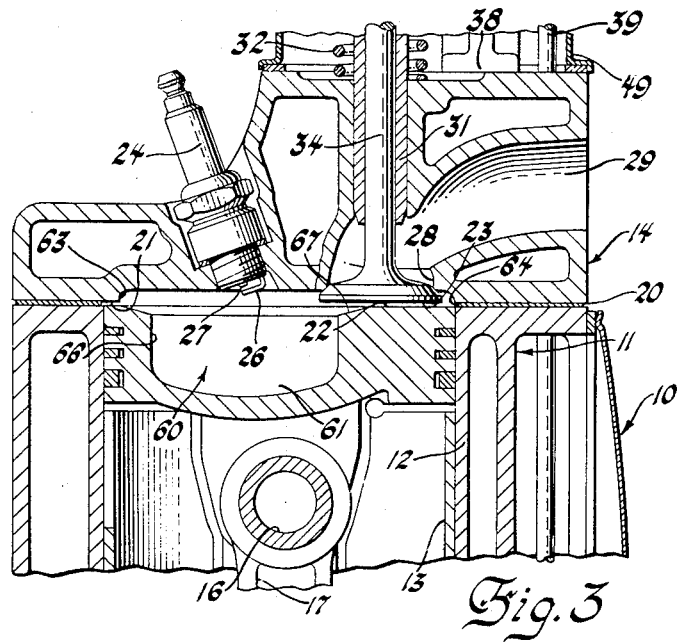
Figure 3 is a transverse sectional view of an engine having a modified form of combustion chamber as compared with that employed in the engine disclosed by Figures 1 and 2.
Figure 4:
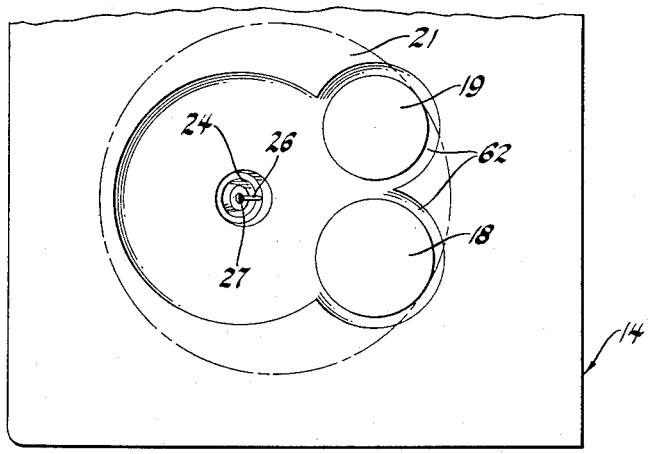
Figure 4 is a bottom plan view of the head employed in the engine disclosed by Figure 3.

The combustion chamber 60 in the structure disclosed by Figures 3 and 4 comprises a chamber 61 formed within the piston 13, valve clearances 62 formed within the head 14 and around the valves 18 and 19, extension chamber 63 formed within the head 14 in opposed relation to the chamber 61 and the clearance space 64 between the planar end 22 of the piston 13 and the plane lower surfaces 23 of the head 14 and the inlet and exhaust valves 18 and 19. The chamber 61 has a cylindrical wall 66 and an outwardly tapering frusto-conical wall 67, both of which are formed by surfaces of revolution about a line through the spark gap 27 and parallel to the axis of the cylinder 12. The clearance spaces 62 are formed as surfaces of revolution about the axes of the valves 34 which are parallel to the axis of the cylinder 12.

Figure 5:
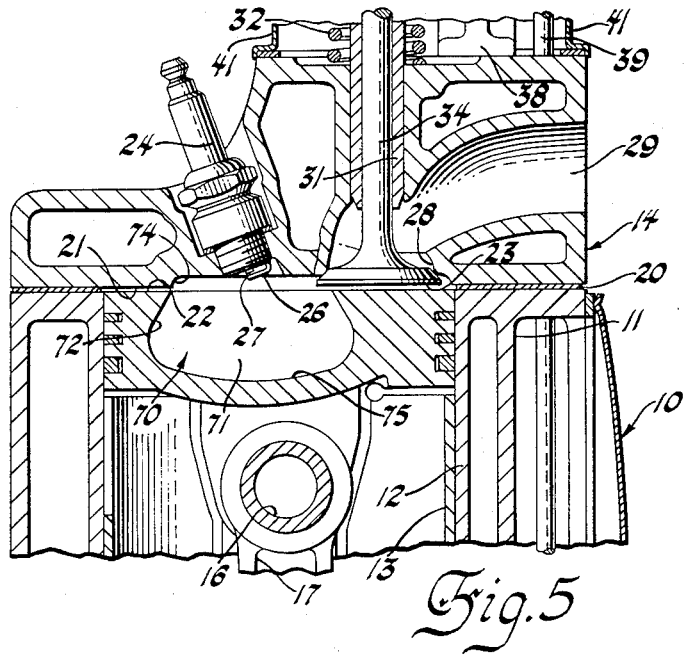
Figure 5 is a transverse sectional view of an engine embracing another modified form of combustion chamber constructed according to the principles of the invention.
Figure 6:
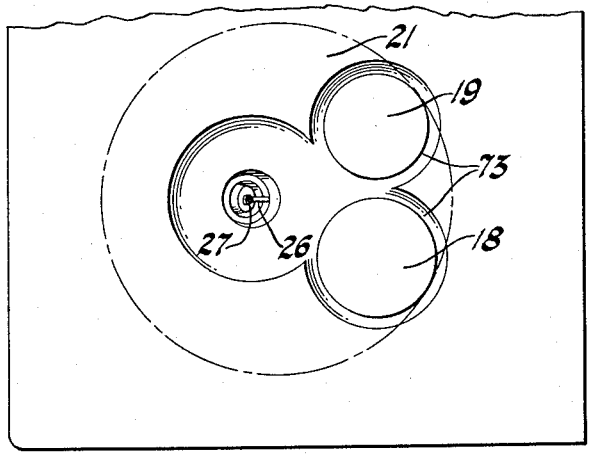
Figure 6 is a bottom plan view of the head of the engine disclosed by Figure 5.

The combustion chamber 70 in the structure disclosed by Figures 5 and 6 comprises a chamber 71 which is formed in the piston 13 and has a concave wall 75 formed by a surface of revolution about a line through the spark gap 27 and parallel to the axis of the cylinder 12. The chamber 71 also includes a frusto-conical surface 72 with the end thereof of smallest diameter terminating in the plane surface 22 forming the end of the piston 13. The combustion chamber 70 also includes clearance spaces 73 which are formed as surfaces of revolution about the axes of the valves 18 and 19 and which extend within the heads 14 to the lower edges of the seats of the valves 18 and 19. The clearance spaces 73 merge with and continue across the head 14 as an extension chamber 74 which also forms a continuation of the chamber 71 formed within the piston 17. The spark gap 27 is on the plane surface within the head 14 which forms the upper wall of the extension space 74 and the clearance spaces 73. This upper wall is formed in parallel relation to the surfaces 21 and 22.

The engines 10 are not only capable of manufacture at a relatively low cost, but comprise combustion chambers, the greater portions of which are formed to provide minimum and equal length flame travel in all directions from the spark gaps of the spark plugs therein. In the remaining and lesser portions thereof the flame front will be relatively narrow and will be somewhat cooled and decreased in velocity by the adjacent walls forming the clearance spaces of the combustion chamber, thereby rendering the engines suitable for use with hydro-carbon and other fuels having relatively low octane ratings.

I claim:

1. An internal combustion engine comprising a cylinder having a cylinder head and a piston therein, said head and said piston being formed to provide plane surfaces uniformly spaced from one another to provide a minimum mechanical clearance space for operating said piston within said cylinder, inlet and exhaust valves in said head and at one side of said cylinder and opposed to said piston and having end surfaces forming substantially a continuation of the plane surface of said head, a spark plug within said head and between said valves and on the side of said cylinder opposed to said valves and having a spark gap between the terminals thereof and within said cylinder, and a firing chamber formed between said head and said piston and inwardly of and communicating with said clearance space, said firing chamber having a wall on one side of said spark gap and extending into said piston and having circular surface elements defined by planes normally intersecting the axis of said cylinder and said firing chamber wall, all points on each of said elements being disposed equidistantly from said spark gap.

2. An internal combustion engine comprising a cylinder and a head and having a piston operable within said cylinder, said head and said piston having opposed and parallel and plane surface walls forming a minimum mechanical clearance space for the operation of said piston in said cylinder, inlet and exhaust valves disposed in said head and on one side of said head and in opposed relation to said piston, said valves having end surfaces forming substantially a continuation of the plane surface of said head, a spark plug in said head and having a spark gap between the terminals thereof and disposed within said cylinder, and a firing chamber formed between said head and said piston and having a wall projecting into said piston, said wall having circular surface elements defined by planes normally intersecting the axis of said cylinder and said firing chamber wall, all points on each of said elements being disposed equidistantly from said spark gap.

3. An internal combustion engine comprising a cylinder having a head and having a piston operable in said cylinder, a spark plug having the spark gap terminals thereof projecting into said cylinder and being disposed in said head on one side of the axis of said cylinder, and a firing chamber formed between said head and said piston and having a wall projecting into said piston, said wall having circular surface elements defined by planes normally intersecting the axis of said cylinder and said firing chamber wall, all points on each of said elements being disposed equidistantly from said spark gap and a pair of inlet and exhaust valves for said cylinder, said valves being located in said head on the side of said cylinder opposite said spark plug.

4. An internal combustion engine comprising a cylinder having a head and having a piston operable in said cylinder, a pair of valves for operating said cylinder, said valves being disposed on one side of said cylinder and in said head and having end surfaces disposed in parallel relation to the end of said piston, a firing chamber formed between said head and said piston and having a wall projecting into said piston, said wall being formed to provide a surface of revolution about an axis disposed in parallel relation to the axis of said cylinder and on the side of said cylinder opposite said valves, and a spark plug in said head and having a spark gap between the spark gap terminals thereof disposed on said axis of said wall.

5. An internal combustion engine comprising a cylinder having a head and having a piston operable therein, a pair of valves disposed in said head on one side of the axis of said cylinder and having the axes thereof extending in parallel relation to the axis of said cylinder, a spark plug in said head and having a spark gap formed by the spark gap terminals thereof disposed within said cylinder, said head and the head end of said piston being formed by parallel plane surfaces disposed in spaced relation to one another and normally intersecting the axis of said cylinder, and a combustion chamber formed between said head, said piston and said cylinder, said combustion chamber being formed by surfaces of revolution about the axes of said valves, by a surface of revolution about the axis of said cylinder, and by a surface of revolution about a line through the spark gap of said spark plug and extending within said cylinder in parallel relation to the axis of said cylinder, said surfaces of revolution being adapted to intersect one another.

6. An internal combustion engine comprising a cylinder having a head and a piston operable therein, inlet and exhaust valves disposed in said head on one side of the axis of said cylinder, a spark plug in said head and having a spark gap formed between the terminals thereof and extending within the combustion chamber of said cylinder, said combustion chamber being formed in said head, said piston and said cylinder and having a part within said piston formed by a surface of revolution about a line through said spark gap and extending within said cylinder in parallel relation to the axis of said cylinder.

7. An internal combustion engine as defined by claim 6 and in which all points on said surface of revolution within said piston are equally distant from said spark gap.

8. An internal combustion engine as defined by claim 6 and in which said surface of revolution within said piston comprises a cylindrical surface formed about said line.

9. An internal combustion engine as defined by claim 6 and in which said surface of revolution within said piston comprises a frusto-conical surface formed about said line and having the end thereof of smallest diameter at the head end of said piston.

10. An internal combustion engine as defined by claim 6 and in which said surface of revolution in said piston comprises a frusto-conical surface having the end thereof of greatest diameter terminating in the end wall at the head end of said piston.

References Cited in the file of this patent

UNITED STATES PATENTS

| 2,402,213 | Starr | June 18, 1946 |
| 2,614,549 | Vaughan | Oct. 21, 1952 |

FOREIGN PATENTS

| 426,314 | Germany | Mar. 8, 1926 |

OTHER REFERENCES

Automotive Industries, page 38, Oct. 15, 1952, "Future Developments" by C. G. A. Rosen, 8 pages.